United States Patent
Severinski et al.

(10) Patent No.: US 10,974,644 B2
(45) Date of Patent: Apr. 13, 2021

(54) VEHICLE SEAT INCLUDING ILLUMINATED FEATURE

(71) Applicant: Lear Corporation, Southfield, MI (US)

(72) Inventors: Paul S. Severinski, Brownstown, MI (US); Lisa Townley, Brownstown, MI (US); Louella Ann Patterson, Goodells, MI (US); Arjun Yetukuri, Rochester Hills, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 16/333,609

(22) PCT Filed: Sep. 18, 2017

(86) PCT No.: PCT/US2017/052043
§ 371 (c)(1),
(2) Date: Mar. 15, 2019

(87) PCT Pub. No.: WO2018/053417
PCT Pub. Date: Mar. 22, 2018

(65) Prior Publication Data
US 2019/0225143 A1   Jul. 25, 2019

Related U.S. Application Data (60) Provisional application No. 62/396,510, filed on Sep. 19, 2016.

(51) Int. Cl.
*B60R 13/02* (2006.01)
*B29C 35/08* (2006.01)
(Continued)

(52) U.S. Cl.
CPC ............... *B60Q 3/233* (2017.02); *B60N 2/58* (2013.01); *B60Q 3/60* (2017.02); *B60Q 3/80* (2017.02)

(58) Field of Classification Search
CPC .......... B60Q 3/233; B60Q 3/745; B60Q 3/62; B60Q 3/64; B60Q 3/66; G02B 6/0018;
(Continued)

(56) References Cited

U.S. PATENT DOCUMENTS 4,386,476 A * 6/1983 Schulman ............ G02B 6/0086
40/361
4,751,434 A * 6/1988 Helling ................. A61P 27/02
315/183

(Continued)

FOREIGN PATENT DOCUMENTS

KR          200325451 Y1    9/2003

OTHER PUBLICATIONS

PCT International Search Report and Written Opinion, Application No. PCT/US2017/052043, dated Dec. 26, 2017.

*Primary Examiner* — Shin H Kim
(74) *Attorney, Agent, or Firm* — MacMillan, Sobanski & Todd, LLC (57) ABSTRACT

A vehicle seat includes an illuminated graphic feature. The vehicle seat includes an occupant support. The vehicle seat also includes a light source supported on the occupant support. The light source emits light in an illumination direction when activated. The seat also includes a graphic image that the light that travels in the illumination direction. A cover layer is located in the illumination direction from the graphic image. An illuminated graphic feature is visible through the cover layer when the light source is activated.

14 Claims, 5 Drawing Sheets

(51) Int. Cl.
*B60Q 3/233* (2017.01)
*B60Q 3/60* (2017.01)
*B60N 2/58* (2006.01)
*B60Q 3/80* (2017.01)

(58) Field of Classification Search
CPC .... G02B 6/0028; G02B 6/006; G02B 6/0088; G02B 6/0043; C09D 11/322; C09D 11/101; C09D 11/10; G09F 9/33; G09F 2003/025
See application file for complete search history.

(56) References Cited

U.S. PATENT DOCUMENTS

| | | | | |
|---|---|---|---|---|
| 4,975,809 | A * | 12/1990 | Ku | B42D 15/022 362/104 |
| 5,147,129 | A * | 9/1992 | Ku | B42D 15/022 362/106 |
| 5,390,436 | A * | 2/1995 | Ashall | G02B 6/0043 40/546 |
| 5,536,558 | A * | 7/1996 | Shelton | G09F 13/20 156/209 |
| 5,938,991 | A * | 8/1999 | Pollock | A63C 19/00 264/132 |
| 5,943,698 | A * | 8/1999 | Blanks | G09F 21/02 2/115 |
| 6,082,816 | A * | 7/2000 | Gottlieb | A47C 7/62 297/188.1 |
| 6,540,302 | B1 * | 4/2003 | Crocker | A47C 7/42 297/181 |
| 7,600,335 | B2 * | 10/2009 | Suprina | G09F 7/06 297/217.1 |
| 7,681,345 | B2 * | 3/2010 | Suprina | G09F 23/06 40/320 |
| 8,164,703 | B2 * | 4/2012 | Cheng | G02B 6/0088 349/58 |
| 8,375,613 | B2 * | 2/2013 | Spiro | G02B 6/0086 40/546 |
| 9,028,123 | B2 * | 5/2015 | Nichol | G02B 6/0018 362/603 |
| 9,449,539 | B2 * | 9/2016 | Sciackitano | G09F 13/16 |
| D790,096 | S * | 6/2017 | Kramer | D26/31 |
| 10,585,232 | B2 * | 3/2020 | Lan | F21V 3/00 |
| 2002/0074839 | A1 * | 6/2002 | Mahan | A47C 7/425 297/228.1 |
| 2003/0056866 | A1 * | 3/2003 | Sheppard, Jr. | A45C 13/08 150/160 |
| 2005/0100689 | A1 * | 5/2005 | He | D06Q 1/12 428/32.79 |
| 2005/0206207 | A1 * | 9/2005 | Kenny | A47C 31/11 297/228.1 |
| 2006/0039135 | A1 | 2/2006 | Jones et al. | |
| 2006/0087165 | A1 * | 4/2006 | Gharabegian | F21V 33/0012 297/217.6 |
| 2006/0207134 | A1 * | 9/2006 | Harry | H05B 45/00 40/453 |
| 2008/0209776 | A1 * | 9/2008 | Suprina | G09F 23/06 40/1 |
| 2008/0209777 | A1 * | 9/2008 | Suprina | G09F 23/00 40/1 |
| 2009/0219734 | A1 * | 9/2009 | Sawada | G09F 13/18 362/616 |
| 2010/0107463 | A1 * | 5/2010 | Spiro | G02B 6/0086 40/546 |
| 2010/0186269 | A1 * | 7/2010 | Suprina | G09F 23/06 40/1 |
| 2010/0258419 | A1 * | 10/2010 | Chung | G02B 6/0035 200/314 |
| 2010/0287802 | A1 * | 11/2010 | Harris | G09F 7/00 40/593 |
| 2010/0296302 | A1 | 11/2010 | Welch, Sr. et al. | |
| 2011/0109111 | A1 * | 5/2011 | Petouhoff | B60N 2/58 296/1.08 |
| 2011/0176325 | A1 * | 7/2011 | Sherman | G02B 6/0045 362/551 |
| 2012/0011753 | A1 * | 1/2012 | Ivanovic | G09F 13/10 40/541 |
| 2013/0155723 | A1 * | 6/2013 | Coleman | G02B 6/0018 362/621 |
| 2014/0071653 | A1 * | 3/2014 | Thompson | G02B 6/0055 362/19 |
| 2015/0197186 | A1 | 7/2015 | Salter et al. | |
| 2015/0221242 | A1 * | 8/2015 | Cable | G09F 7/04 40/661.01 |
| 2015/0274068 | A1 | 10/2015 | Falconi | |
| 2015/0317923 | A1 * | 11/2015 | Edmonds | G09F 3/0294 40/541 |
| 2015/0330597 | A2 * | 11/2015 | Schaffer | B82Y 30/00 362/603 |
| 2018/0149907 | A1 * | 5/2018 | Gahagan | G02F 1/133526 |
| 2019/0135199 | A1 * | 5/2019 | Galan Garcia | B60R 16/037 |
| 2019/0308553 | A1 * | 10/2019 | Zander | B60Q 3/74 |

* cited by examiner

Fig. 9 ated graphic assembly illustrated in FIG. 3.
VEHICLE SEAT INCLUDING ILLUMINATED FEATURE

CROSS-REFERENCE TO RELATED APPLICATIONS

This application claims the benefit of U.S. Provisional Application No. 62/396,510, filed Sep. 19, 2016, the disclosure of which is incorporated herein by reference.

BACKGROUND OF THE INVENTION

The present invention relates in general to vehicle seats. In particular, this invention relates to an improved structure for a vehicle seat that includes one or more illuminated graphic assemblies.

Vehicles, such as passenger cars, are often provided with graphic features, such as manufacturer brand names, logos, or other decorative elements. These graphic features can be included in a variety of locations on and in the vehicle. It is often desirable that these graphic features be visible not only to occupants within the interior of the vehicle, but also to people viewing the vehicle from the exterior. Thus, such graphic elements may be included on either, or both, of the interior and exterior of the vehicle. Surfaces, such as vehicle seats, may include embroidered logos. It is often desirable that these graphic features have a distinct visual appearance. It would be desirable to provide an improved structure for a vehicle seat that includes one or more illuminated graphic assemblies.

SUMMARY OF THE INVENTION

The invention relates to an improved structure for a vehicle seat that includes one or more illuminated graphic assemblies. The vehicle seat includes an occupant support. The vehicle seat also includes a light source supported on the occupant support. The light source emits light in an illumination direction when activated. The seat also includes a graphic image that limits the light that travels in the illumination direction. A cover layer is located in the illumination direction from the graphic image. An illuminated graphic feature is visible through the cover layer when the light source is activated.

In another embodiment, the invention relates to a vehicle seat having an occupant support with a trim cover. The vehicle seat also includes an accent feature. The accent feature includes a light source affixed to the occupant support. An accent cover is also affixed to the trim cover. The accent cover is located in an illumination direction from the light source so that light from the light source passes through the accent cover.

Various aspects of this invention will become apparent to those skilled in the art from the following detailed description of the preferred embodiments, when read in light of the accompanying drawings.

DETAILED DESCRIPTION OF THE PREFERRED EMBODIMENTS

Figure 1:
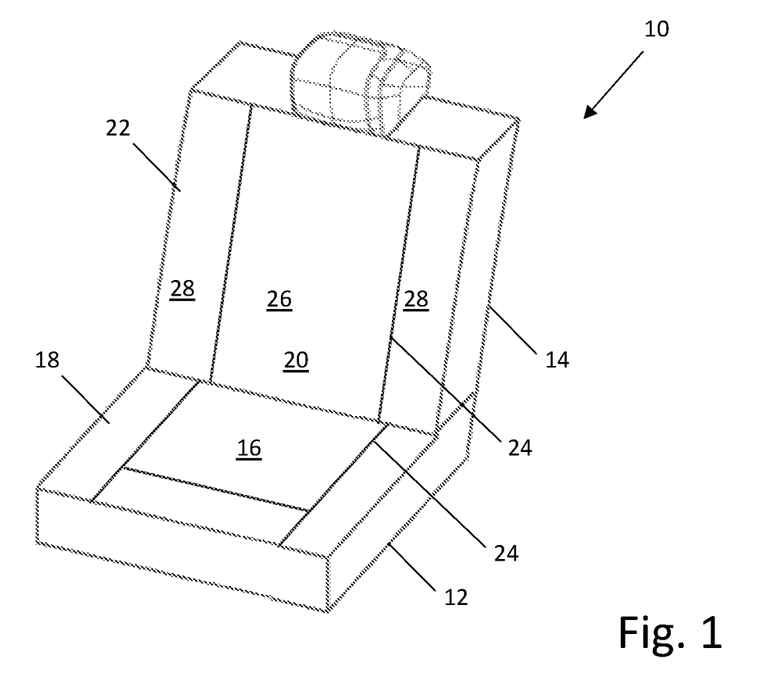
FIG. 1 is a perspective view of a vehicle seat that includes an illuminated graphic assembly in accordance with this invention, shown in an off state.
Figure 2:
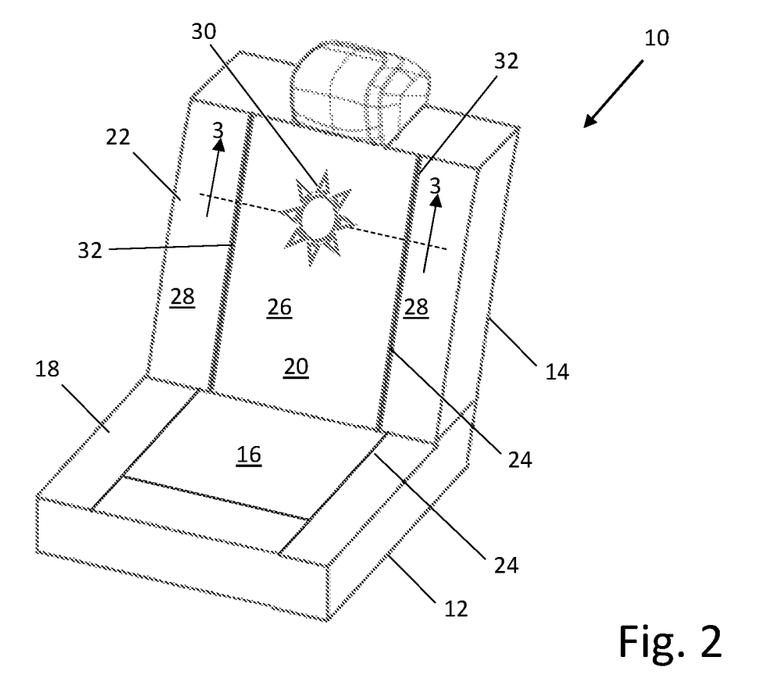
FIG. 2 is a view similar to FIG. 1 showing the vehicle seat with the illuminated graphic assembly shown in an on state.

Referring now to the drawings, there are illustrated in FIGS. 1 and 2 perspective views of a vehicle seat, indicated generally at 10, in accordance with a first embodiment of this invention. The illustrated vehicle seat 10 is a bucket seat, but may be any desired type of seat. The vehicle seat 10 includes a seat 12 and a back 14. The seat 12 includes a seat A-surface 16, which is the occupant-facing surface of the seat 12. The seat 12 includes a seat trim 18 on the seat A-surface 16. The illustrated seat trim 18 is made of leather, but may be made of any suitable material. The back 14 includes a back A-surface 20, which is the occupant-facing surface of the back 14. The back 14 includes a back trim 22 on the back A-surface 20. The illustrated back trim 22 is made of leather, but may be made of any suitable material. During normal use of the vehicle seat 10, an occupant will rest on portions of the seat 12 and the back 14.

The illustrated seat 12 and back 14 include a plurality of seams 24 on the seat A-surface 16 and on the back A-surface 20. The seams 24 may separate panels of material or may connect different types of material that are part of the seat trim 18 and the back trim 22, if desired. The illustrated back trim 22 includes a central panel 26 and side panels 28. However, the vehicle seat 10 may include any desired arrangement of seams 24 and panels 26 and 28.

Referring to FIG. 2, a perspective view similar to FIG. 1 is illustrated, with an illuminated graphic feature 30 visible. The illustrated illuminated graphic feature 30 is lit from behind and may be turned on or off, making it selectively visible, as will be described below. The illustrated illuminated graphic feature 30 is located on the back A-surface 20 of the vehicle seat 10, but may be located on any desired surface of the vehicle seat 10. Additionally, the illuminated graphic feature 30 may be located on any other desired surface. The illustrated illuminated graphic feature 30 is a star-shaped icon, but the illuminated graphic feature 30 may have any desired shape or appearance. For example, the illuminated graphic feature 30 may include a manufacturer's name, logo, or any other identifying information. Alternatively, the illuminated graphic feature 30 may include any desired decorative or aesthetic image.

The illustrated vehicle seat 10 also includes two illuminated accents 32. The illuminated accents 32 are lit from behind and may be turned on or off, making them selectively visible, as will be described below. The illustrated illuminated accents 32 are located along two of the seams 24 on the back A-surface 20, but may be located on any desired surface of the vehicle seat 10. Additionally, the illuminated accents 32 may be located on any other desired surface. The illustrated illuminated accents 32 are parallel lines located on opposed sides of the illuminated graphic feature 30, but the illuminated accents 32 may have any desired shape or combination of shapes and may be arranged in any desired pattern.

Figure 3:
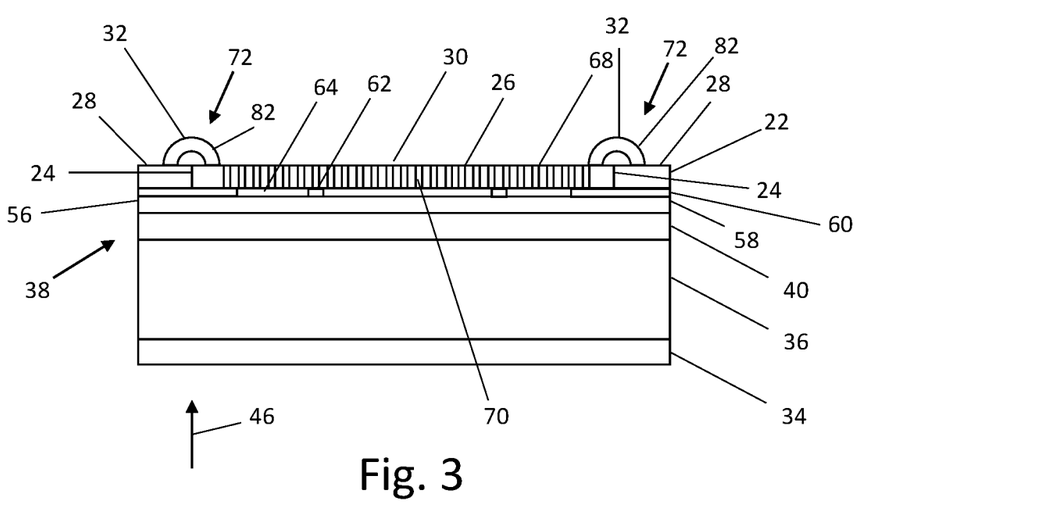
FIG. 3 is a cross-sectional view taken along line 3-3 of FIG. 2 through the illuminated graphic assembly.
Figure 4:
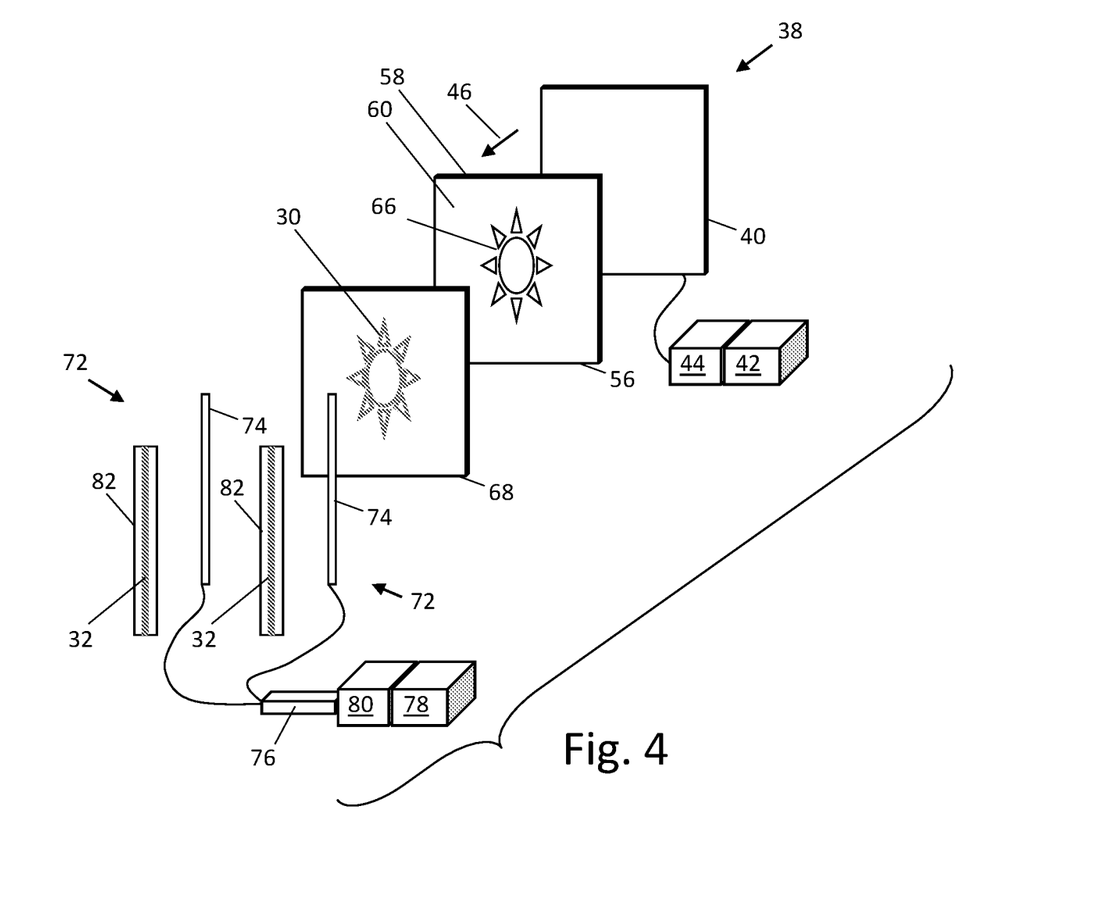
FIG. 4 is an exploded perspective view of the illuminated graphic assembly illustrated in FIG. 3.

Referring to FIG. 3, a cross-sectional view taken along line 3-3 through a portion of the back 14 of FIG. 2 is shown. The back 14 includes a back support structure 34 and a back foam 36 supported thereon. The illustrated back support structure 34 is a steel frame, but may be any desired structure. The back foam 36 is a conventional seat back foam, but may be any desired material or occupant support. The back 14 also includes an illuminated graphic assembly, indicated generally at 38. An exploded view of the illuminated graphic assembly 38 is shown in FIG. 4, and the illuminated graphic assembly 38 will be explained in reference to FIGS. 3 and 4.

The illuminated graphic assembly 38 includes a light source 40. The illustrated light source 40 is an LED light panel, but may be any desired source of light. A power source 42 and a controller 44 selectively provide power to the light source 40. The illustrated light source 40 emits light in a single color, but the light source may emit light in any desired color, may be multi-colored, and may have variable light intensity, if desired. When activated, the light source 40 emits light in an illumination direction 46, toward the back trim 22. The illustrated illuminated graphic assembly 38 includes a single light source 40, but may include any desired number of light sources.

Figure 5:
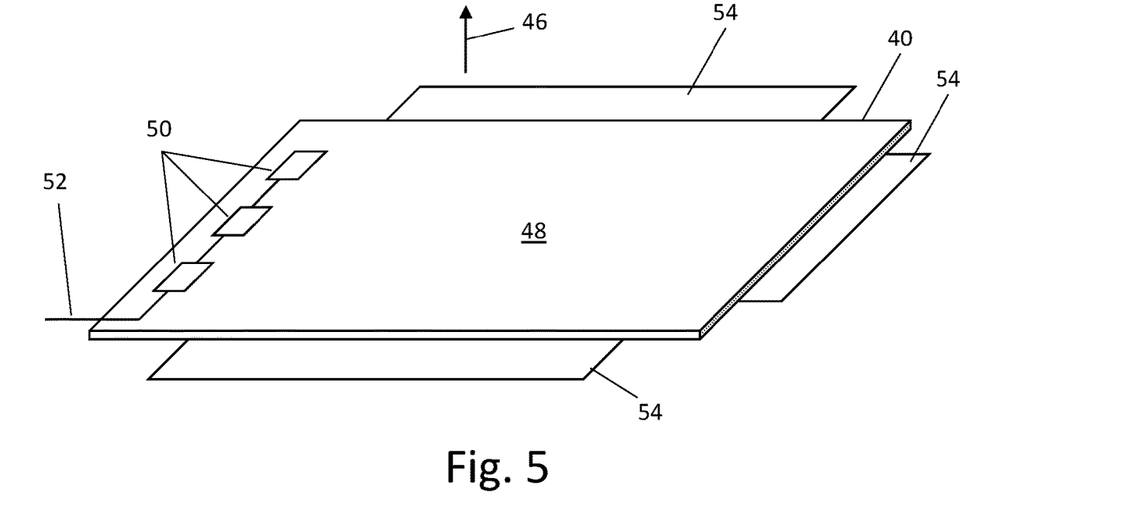
FIG. 5 is a perspective view of a light source of the illuminated graphic assembly.

Referring to FIG. 5, a perspective view of the light source 40 is shown, separate from the illuminated graphic assembly 38. The light source 40 includes a panel 48 that is transparent and flexible. The illustrated panel 48 is made of plastic, but may be made of any desired material. The panel 48 may have any desired optical properties and may be a relatively rigid structure having any desired shape. The illustrated light source 40 includes a plurality of LEDs 50 that may be selectively activated to direct light into the panel 48. The panel 48 includes an optical treatment so that it deflects light from the LEDs 50 in the illumination direction 46. In the illustrated embodiment, the illumination direction 46 is generally perpendicular to the surface of the panel 48, but may be any desired direction. The light source 40 includes an electrical lead 52 that is used to provide electrical current to the LEDs 50.

The light source 40 includes optional flanges 54 that are attached to the panel 48. The illustrated flanges 54 are plastic and may, for example, be connected to the panel 48 by radio frequency welding. However, the flanges 54 may be made of any desired material and may be attached to any desired part of the light source 40 by any desired method. The illustrated embodiment includes three flanges 54, but may include any desired number of flanges 54. The flanges 54 are used to attach the light source 40 to the back 14 of the seat 10 by sewing the flanges 54 onto the back trim 22. Alternatively, the flanges 54 may be sewn onto the back foam 36 or any other desired part of the vehicle seat 10. Alternatively, the light source 40 may be attached to the back 14 by any other desired connector or method, such as by the use of an adhesive between the panel 48 and the back foam 36 or any other desired surface.

Referring back to FIGS. 3 and 4, the illuminated graphic assembly 38 includes a graphic layer 56 that is located in the illumination direction 46 from the light source 40. The illustrated graphic layer 56 includes a substrate 58 supporting a printed layer 60. The printed layer 60 includes opaque areas 62 and transparent areas 64 that define a graphic image 66. The illustrated graphic image 66 is a star-shaped image, but may be any desired shape or combination of shapes. The illustrated opaque areas 62 include a layer of ink on the transparent substrate 58 that prevents the transmission of light from the light source 40 past the graphic layer 56 in the illumination direction 46. The illustrated transparent areas 64 are portions of the substrate 58 that do not include ink and, therefore, allow the transmission of light from the light source 40 past the graphic layer 56 in the illumination direction 46.

Alternatively, the substrate 58 may be opaque, and the transparent areas 64 may be cut-outs in the substrate 58. Additionally, the graphic layer 56 may include translucent areas if desired. For example, the graphic layer 56 may include colored layers that allow certain colors of light to be transmitted through the graphic layer 56 in the illumination direction 46. The graphic layer 56 serves to limit the light from the light source 40 that travels in the illumination direction 46 to the shape of the graphic image 66.

The illuminated graphic assembly 38 also includes a cover layer 68 that is located in the illumination direction 46 from the graphic layer 56. The illustrated cover layer 68 is a portion of the back trim 22 and, more specifically, is a portion of the central panel 26. However, the cover layer 68 may be any desired portion of the vehicle seat 10. As previously described, the cover layer 68 can be made of leather. However, the cover layer 68 may be made of any desired material such as, for example, a woven fabric or a fabric made in part of a transparent or translucent material. The cover layer 68 may include a plurality of perforations 70 that allow light to pass through the cover layer 68 in the illumination direction 46. Light from the light source 40 passes through the cover layer 68 and is visible as the illuminated graphic feature 30.

As also shown in FIGS. 3 and 4, the illustrated vehicle seat 10 also includes two illuminated accent assemblies 72. Each illuminated accent assembly 72 includes an accent light source 74. The illustrated accent light source 74 is an optical fiber that is end-lit by an LED 76. However, the accent light source 74 may be any desired source of light. A power source, indicated schematically at 78 and a controller 80 selectively provide power to the accent light source 74. The illustrated accent light source 74 emits light in a single color, but the light source may emit light in any desired color, may be multi-colored, and may have variable light intensity, as desired. When activated, the accent light source 74 emits light in the illumination direction 46. As will be described below, the accent light sources 74 illuminate the illuminated accents 32. In the illustrated embodiment, the vehicle seat 10 includes two accent light sources 74, but may include any desired number of accent light sources 74. The vehicle seat 10 may include a single accent light source 74 that provide illumination for multiple illuminated accents 32.

In the illustrated embodiment, the accent light source 74 is located in the illumination direction 46 from the back trim 22, but may be placed in any desired location. The illuminated accent assembly 72 includes an accent cover 82 that is located in the illumination direction 46 from the accent light source 74. The illustrated accent cover 82 is a cloth sleeve that is sewn to the back trim 22, but may be any suitable material and connected to the vehicle seat 10 using any desired connector or method. The accent cover 82 includes transparent or translucent portions, and the illuminated accent 32 is visible as light from the accent light source 74 passes through the accent cover 82.

As best shown in FIGS. 1 and 2, the vehicle seat 10 provides resilient, cushioned support surfaces for the occupant on both the seat A-surface 16 and the back A-surface 20. Additionally, the illuminated graphic feature 30 is visible through the back A-surface 20 when the light source 40 is activated, while the illuminated graphic feature 30 is not visible when the light source 40 is deactivated. In the illustrated vehicle seat 10, the accent light sources 74 may be operated independently from the light source 40. This allows, for example, the illuminate accents 32 to be visible while the illuminated graphic feature 30 is not visible. However, the accent light sources 74 and the light source 40 may be operated simultaneously, if desired.

Figure 6:
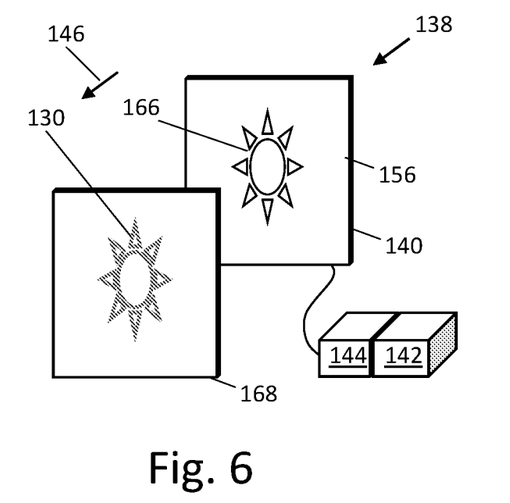
FIGS. 6-9 are exploded perspective views of alternative embodiments of an illuminated graphic assembly in accordance with this invention.

Referring to FIG. 6, an exploded perspective view of an alternative embodiment of an illuminated graphic assembly, indicated generally at 138, is shown. The illuminated graphic assembly 138 is suitable for use on the vehicle seat 10 in accordance with this invention. The illuminated graphic assembly 138 includes a light source 140. The illustrated light source 140 is an LED light panel, but may be any desired source of light. A power source 142 and a controller 144 selectively provide power to the light source 140. The light source 140 includes a graphic layer 156 on a surface thereof. The illustrated graphic layer 156 is a printed layer that is created by dye sublimation, but may be created by any desired technique. The graphic layer 156 serves to limit the light from the light source 140 that travels in an illumination direction 146 to the shape of a graphic image 166. The alternative illuminated graphic assembly 138 includes a cover layer 168 that is located in the illumination direction 146 from the light source 140. The illustrated cover layer 168 is a trim layer of a vehicle seat, but may be any desired layer. Light from the light source 140 passing through the cover layer 168 is visible as an illuminated graphic feature 130.

Figure 7:
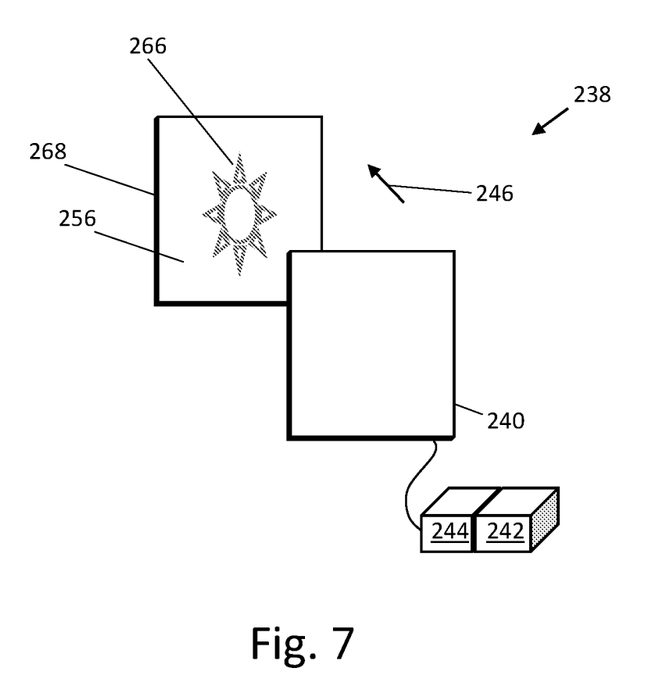

Referring to FIG. 7, an exploded, perspective view, taken from behind, of an alternative embodiment of an illuminated graphic assembly, indicated generally at 238, is shown. The illuminated graphic assembly 238 is suitable for use on the vehicle seat 10 in accordance with this invention. The illuminated graphic assembly 238 includes a light source 240. The illustrated light source 240 is an LED light panel, but may be any desired source of light. A power source 242 and a controller 244 selectively provide power to the light source 240. The alternative illuminated graphic assembly 238 includes a cover layer 268 that is located in an illumination direction 246 from the light source 240. The illustrated cover layer 268 is made of transparent vinyl, but may be made of any desired material. The illustrated cover layer 268 is a trim layer of a vehicle seat, but may be any desired layer. The cover layer 268 includes a graphic layer 256 on a surface thereof. The illustrated graphic layer 256 is a printed layer that is created by dye sublimation, but may be created by any desired technique. The graphic layer 256 serves to limit the light from the light source 240 that travels in an illumination direction 246 to the shape of a graphic image 266. The light from the light source 240 that passes through the cover layer 268 will be visible as an illuminated graphic feature (not shown).

Figure 8:
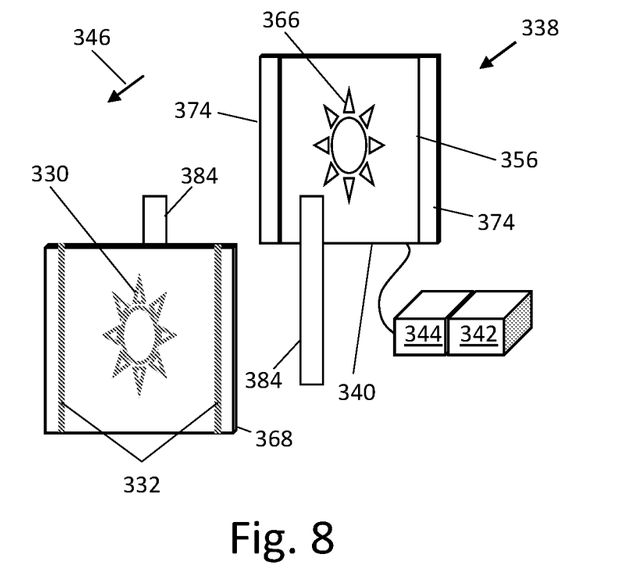

Referring to FIG. 8, an exploded, perspective view of an alternative embodiment of an illuminated graphic assembly, indicated generally at 338, is shown. The illuminated graphic assembly 338 is suitable for use on the vehicle seat 10 in accordance with this invention. The illuminated graphic assembly 338 includes a light source 340. The illustrated light source 340 is an LED light panel, but may be any desired source of light. A power source 342 and a controller 344 selectively provide power to the light source 340. The light source 340 includes a graphic layer 356 on a surface thereof, similar to the previously described illuminated graphic assembly 140. The graphic layer 356 serves to limit the light from the light source 340 that travels in an illumination direction 346 to the shape of a graphic image 366. The alternative illuminated graphic assembly 338 includes a cover layer 368 that is located in the illumination direction 346 from the light source 340. The illustrated cover layer 368 is a trim layer of a vehicle seat, but may be any desired layer. Light from the light source 340 passing through the cover layer 368 is visible as an illuminated graphic feature 330.

The illuminated graphic assembly 338 also includes accent light sources 374 that emit light in the illumination direction 346. The illustrated accent light sources 374 are LED light panels, but may be any desired source of light. For example, the accent light sources 374 may be optical fibers such as the previously-described accent light source 74. The illuminated graphic assembly 338 includes optional optic elements 384 located in the illumination direction 346 from the accent light sources 374. The illustrated optic elements 384 are translucent diffusers, but may be any desired type of element that changes the path of light emitted from the accent light sources 374. The light from the accent light sources 374 passes through the cover layer 368 and is visible as illuminated accents 332. The illustrated illuminated accents 332 are parallel lines of diffused illumination, but may have any desired shape. Additionally, the illuminated accents 332 may be located on any desired portion of the cover layer 368. The illuminated accents 332 may, for example, be located on one or more of the seams 24 of the vehicle seat 10.

Figure 9:
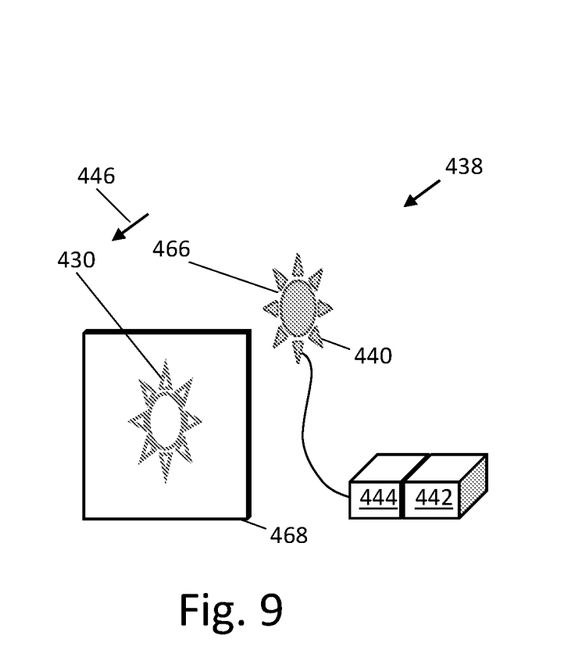

Referring to FIG. 9, an exploded, perspective view of an alternative embodiment of an illuminated graphic assembly, indicated generally at 438, is shown. The illuminated graphic assembly 438 is suitable for use on the vehicle seat 10 in accordance with this invention. The illuminated graphic assembly 438 includes a light source 440. The illustrated light source 440 is a plurality of LED light panels, but may be any desired source of light. A power source 442 and a controller 444 selectively provide power to the light source 440. The light source 440 is arranged to emit light in an illumination direction 446 in the shape of a graphic image 466. The shape of the light source 440 serves to limit the light from the light source 440 that travels in the illumination direction 446 to the shape of the graphic image 466. The light source 440 may have any desired shape and may be made using, for example, end-lit optical fibers that define the shape of the desired illuminated graphic feature. The alternative illuminated graphic assembly 438 includes a cover layer 468 that is located in the illumination direction 446 from the light source 440. The illustrated cover layer 468 is a trim layer of a vehicle seat, but may be any desired layer. Light from the light source 440 passing through the cover layer 468 is visible as an illuminated graphic feature 430.

The principle and mode of operation of this invention have been explained and illustrated in its preferred embodiments. However, it must be understood that this invention may be practiced otherwise than as specifically explained and illustrated without departing from its spirit or scope.

What is claimed is:

1. A vehicle seat including an illuminated graphic assembly comprising:
   a vehicle seat including an occupant support;
   a light source supported on the occupant support that emits light in an illumination direction when activated;
   a graphic image that limits the light that travels in the illumination direction; and
   a cover layer that is located in the illumination direction from the graphic image,
   wherein an illuminated graphic feature is visible through the cover layer when the light source is activated, and wherein either:

(1) the graphic image includes a printed layer on a surface of the light source,
(2) the graphic image includes a printed layer on the surface of the cover layer, or
(3) the graphic image includes the shape of the light source.

2. The vehicle seat defined in claim 1, wherein the cover layer includes a portion of an occupant support surface of the vehicle seat.

3. The vehicle seat defined in claim 1, wherein the illuminated graphic feature is not visible when the light source is not activated.

4. The vehicle seat defined in claim 1, wherein the graphic image is not visible when the light source is not activated.

5. The vehicle seat defined in claim 1, further comprising a graphic layer located in the illumination direction from the light source, wherein the graphic image is supported on the graphic layer.

6. The vehicle seat defined in claim 5, wherein the cover layer includes a portion of an occupant support surface of the vehicle seat.

7. The vehicle seat defined in claim 1, wherein the graphic image includes a printed layer on a surface of the light source.

8. The vehicle seat defined in claim 7, wherein the cover layer includes a portion of an occupant support surface of the vehicle seat.

9. The vehicle seat defined in claim 8, wherein the illuminated graphic feature is not visible when the light source is not activated.

10. The vehicle seat defined in claim 9, wherein the graphic image is not visible when the light source is not activated.

11. The vehicle seat defined in claim 1, wherein the graphic image includes a printed layer on the surface of the cover layer.

12. The vehicle seat defined in claim 1, wherein the graphic image includes the shape of the light source.

13. The vehicle seat defined in claim 12, wherein the illuminated graphic feature is not visible when the light source is not activated.

14. The vehicle seat defined in claim 13, wherein the graphic image is not visible when the light source is not activated.

* * * * *